US008297938B2

(12) United States Patent
Dainez et al.

(10) Patent No.: US 8,297,938 B2
(45) Date of Patent: Oct. 30, 2012

(54) SYSTEM AND METHOD OF CONTROLLING A LINEAR COMPRESSOR

(75) Inventors: Paulo Sergio Dainez, Joinville (BR); Dietmar Erich Bernhard Lilie, Joinville (BR); Nerian Fernando Ferreira, Joinville (BR); Marcelo Knies, Joinville (BR)

(73) Assignee: Whirlpool S.A., Sao Paulo (BR)

( * ) Notice: Subject to any disclaimer, the term of this patent is extended or adjusted under 35 U.S.C. 154(b) by 126 days.

(21) Appl. No.: 12/918,681

(22) PCT Filed: Feb. 20, 2009

(86) PCT No.: PCT/BR2009/000049

§ 371 (c)(1), (2), (4) Date: Jan. 19, 2011

(87) PCT Pub. No.: WO2009/103138

PCT Pub. Date: Aug. 27, 2009

(65) Prior Publication Data

US 2011/0103973 A1 May 5, 2011

(30) Foreign Application Priority Data

Feb. 22, 2008 (BR) ..................................... 0800251

(51) Int. Cl.
*F04B 49/06* (2006.01)

(52) U.S. Cl. .......................... 417/44.11; 417/45; 417/53

(58) Field of Classification Search ............... 417/44.11, 417/45, 530

See application file for complete search history.

(56) References Cited

U.S. PATENT DOCUMENTS 6,176,683 B1 1/2001 Yang
2003/0099550 A1 5/2003 Kim
2007/0276544 A1 11/2007 Dainez et al.

FOREIGN PATENT DOCUMENTS

DE 1999 18 930 11/2000
WO WO 00/79671 12/2000
WO WO 01/48379 7/2001

(Continued)

OTHER PUBLICATIONS

International Search Report mailed Nov. 25, 2009 for International application No. PCT/BR2009/000049.

(Continued)

*Primary Examiner* — Charles Freay
*Assistant Examiner* — Patrick Hamo
(74) *Attorney, Agent, or Firm* — Fay Sharpe LLP

(57) ABSTRACT

The present invention relates to a system and method of controlling a linear compressor (10), which is capable of fine-tuning the compressor when necessary, throughout the operating period of the compressor, so that said compressor operates at maximum capacity, wherein the piston (1) achieves a maximum displacement amplitude, closely approaching the cylinder head (2) without colliding with it. The system and the method according to the invention are also intended to control the operation of the linear compressor throughout its operating period, also seeking to maximize its performance and to reduce or optimize its power consumption. According to the present invention, the fine-tuning and control of the operation of the linear compressor are carried out by means of the combination of a technique for controlling a compressor without a sensor, and a technique for controlling the compressor with the aid of a sensor.

21 Claims, 13 Drawing Sheets

Start Slope Control

Measure Slope, Period and Power

Slope_lim =(K1 . Period) + (K2 . Power) - Offset

Measure Slope > Slope_lim

Yes

No

Increase Power

Decrease Power

Impact Detected

Yes

No

1

FOREIGN PATENT DOCUMENTS

| | | |
|---|---|---|
| WO | WO 03/044365 | 5/2003 |
| WO | WO 2004/104419 | 12/2004 |
| WO | WO 2005/006537 | 1/2005 |
| WO | WO 2005/054676 | 6/2005 |
| WO | WO 2005/071265 | 8/2005 |

OTHER PUBLICATIONS

Written Opinion of the International Searching Authority mailed Nov. 25, 2009 for International application No. PCT/BR2009/000049.

Response to Written Opinion mailed Feb. 25, 2010 for International application No. PCT/BR2009/000049.

SYSTEM AND METHOD OF CONTROLLING A LINEAR COMPRESSOR

The present invention relates to a system and method of controlling a linear compressor, capable of fine-tuning the compressor when necessary, throughout its operating period, so that the compressor operates at maximum capacity, in which the piston attains a maximum displacement amplitude, approaching the cylinder head as near as possible without colliding with it. The system and the method according to the invention are also intended to control the operation of the linear compressor throughout its operating period, further seeking to maximize its performance and to reduce or optimize its power consumption. Linear compressors of this kind are generally applied to coolers, air-conditioning units and sometimes to fluid pumps.

DESCRIPTION OF THE STATE OF THE ART

Currently, the use of linear compressors driven by linear motors is commonplace in cooling systems, such as coolers and air-conditioning appliances. Linear compressors present low energy consumption and, therefore, are highly efficient for the application in question.

The linear compressor normally comprises a piston which reciprocates inside a cylinder. The head of this cylinder normally houses suction valves and gas discharge valves, which regulate the entry of low pressure gas and the exit of high pressure gas from inside the cylinder. The axial motion of the piston inside the cylinder of the linear compressor compresses the gas allowed in by the suction valve, increasing the pressure thereof, and discharges it by the discharge valve to a high pressure zone.

The linear compressor must be capable of identifying the position and controlling the piston displacement inside the cylinder to prevent the piston from colliding with the cylinder head, which causes a loud and disagreeable noise, in addition to wear and tear of the equipment, thus reducing its durability.

At the same time, to optimize the efficiency and the performance of the linear compressor and minimize the compressor's consumption of power, it is desirable that the piston should be displaced as much as possible inside the cylinder, approaching as close as possible to the piston head without colliding with it. For this to be possible, the displacement amplitude of the cylinder when the compressor is in operation must be known precisely, and the larger the estimated error of this amplitude, the greater the safety distance will have to be between the maximum point of displacement of the piston and the cylinder head to avoid collision thereof. This safety distance provides a loss in efficiency of the compressor. If the performance of the compressor is not optimized, it will often be necessary to overscale the design of the compressor for the conditions in which it will operate, increasing the cost of the equipment, as well as its power consumption.

Certain systems of displacement control and position recognition of the piston inside the cylinder are already known without the state of the art, particularly applied to linear motors and/or compressors, which simultaneously fine-tune the piston displacement amplitude.

The current state of the art can be summarized into two system groups. The first refers to the control of compressors without a sensor. In this control method, there is no real (physical) sensor installed in the compressor. The control reads other system variables such as: current and/or voltage of the compressor, temperature of the evaporator, operating frequency, and estimates the piston stroke.

The second group of systems comprises control with a sensor. In this case, a sensor measures the displacement and/or distance between the fixed part, for example, the cylinder head, or any other point and the piston, or any point of a mobile part, or just the limit distance for safe operations. Under this method, fine-tuning may be required during the production phase of the compressor or during its functioning.

International patent application WO0148379 describes a method of controlling a compressor designed to control the stroke of the piston of a linear compressor, allowing the piston to advance as far as the end of its mechanical stroke in extreme conditions of load, without allowing the piston to collide with the valve system. An average voltage is applied to a linear motor, controlling the movement of the piston. A first time of movement of the piston is measured and compared with a foreseen time of movement. The voltage applied to the motor is altered, if the first movement time is different from the foreseen movement time, the foreseen movement time being such that the movement of the piston will reach a maximum point (M) being substantially close to the end of the piston stroke.

Patent document WO2005006537 describes a method of controlling the movement of an electric motor, which is fed by a total voltage proportional to the network voltage. The method comprising steps of making a first measurement of level of the network voltage at a first moment of measurement; making a second measurement of level of the network voltage at a second moment of measurement; calculating the value of the derivative of the values measured in function of the first and second moments of measurement to obtain a value of a proportional network voltage; and altering the value of the total voltage fed to the motor, proportionally to the value of the proportional network.

Patent document WO2005071265 describes the operation of a linear compressor in resonance in its greatest possible efficiency throughout its operation. The linear compressor comprises a piston driven by a linear motor, the piston having a displacement amplitude controlled by means of a controlled voltage having a voltage frequency applied to the linear motor and adjusted by a processing unit. The amplitude of piston displacement is dynamically controlled in function of a variable demand of the cooling system. The processing unit adjusts the amplitude of piston displacement so that the linear compressor will be dynamically kept on resonance throughout the variations in demand of the cooling system.

Patent document WO2005054676 relates to a system of controlling a fluid pump provided with means to calibrate the respective functioning at the time of the first use or in cases of problems caused by electric or mechanical failures. The fluid pump is provided with a piston-position sensing assembly and an electronic controller associated to the sensor assembly. The electronic controller will monitor the piston displacement within the respective cylinder by detecting an impact signal. The impact signal is transmitted by the sensing assembly upon occurrence of an impact of the piston with the stroke end. The electronic controller successively incrementing the piston displacement stroke upon a trigger signal as far as the occurrence of the impact to store a maximum value of piston displacement.

Patent document WO03044365 relates to a free piston gas compressor comprising a cylinder, a reciprocating piston inside the cylinder, and a reciprocating linear electric motor coupled to the piston having at least one excitation winding. A measure of the reciprocation time of the piston is obtained, any change in the reciprocation time is detected and the power input to said excitation winding is adjusted in response to any change detected in reciprocation time.

Patent document WO0079671 discloses a linear motor having a shorted stator, where the armature magnets are controlled to reciprocate to a greater maximum displacement than for an equivalent conventional linear motor, using a minimum of sensors. The linear motor is driven at its resonant frequency. A determination of the maximum current is made based on the relationship with the resonant frequency and the evaporating temperature/pressure of the vapor entering the compressor. The current is then limited to control the maximum displacement to avoid damage.

As indicated, none of the documents above propose the control and fine-tuning of the piston displacement inside the cylinder combining a technique of controlling compressors without a sensor and a technique of controlling compressors with a sensor.

OBJECTIVES OF THE INVENTION

A first object of the invention is to control the stroke of the piston of a linear compression, allowing the piston to advance up to the end of its mechanical stroke, without colliding with the top of the cylinder, and optimizing the capacity of the compressor.

Another object of the invention is to implement an automatic fine-tuning system during the normal working of the compressor that dispenses with the fine-tuning procedure during the process of production or assembly, and that is capable of operating the piston having the least distance possible from the end of the stroke of the compressor.

It is a further object of the invention to ensure the feasibility of the use of less accurate sensors or with gain and off-set derivatives, without hindering the performance of the system in terms of efficiency and maximum capacity.

It is still a further object of the invention to allow the gain and the offset of the sensor signal to be adjusted based on the working condition of the sensor.

Still another object of the invention is to implement a simple solution to achieve the above objectives so that it may be applied to industrial scale production.

BRIEF DESCRIPTION OF THE INVENTION

The objects of the invention are achieved by means of a linear compressor control system comprising a linear motor that drives the reciprocating motion of a piston inside a cylinder, said system also comprising a position-detecting circuit which generates a displacement signal indicating the piston displacement amplitude; an impact-detecting circuit which generates an impact signal indicating the occurrence of impact of the piston with the cylinder head; a control circuit that applies a variable drive signal on the linear motor, the control circuit receives the displacement signal and the impact signal, and calculates, based on these signals and the drive signal, at least an impact prevention limit parameter for the displacement signal, the control circuit varies the drive signal of the motor, compares the displacement signal resulting from the variation of the drive signal with the impact prevention limit parameter, and adjusts the drive signal of the motor based on the result of the comparison.

The impact prevention limit parameter for the displacement signal of the piston determines a limit for the maximum displacement amplitude of the piston without impact between the piston and the cylinder head.

The control circuit of the system according to the invention preferably comprises a data processor which processes the displacement signal, the impact signal and the drive signal, and calculates the impact prevention limit parameter, and a comparator that compares the impact prevention limit parameter with the displacement signal and emits a signal indicating whether the displacement signal is within an anti-impact safety operating area. The control circuit receives signals indicating the operating conditions of the compressor and calculates the new drive signal of the motor also based on these operating condition signals of the compressor.

The control system according to the invention is preferably applied to a cooling system, in which the control circuit receives signals indicating the operating conditions of the cooling system and calculates the new drive signal of the motor also based on these cooling system signals.

The impact prevention limit parameter is proportional to the variation of the displacement signal at the moment of impact, and is preferably calculated by the equation $$\text{SLOPE min}=K1\times\text{Period}+K2\times\text{Power}-\text{Offset\_max}$$

Wherein:

Slope_min is the variation value of the displacement signal at the moment of impact;

K1 and K2 are, respectively, offset period and power constants of the drive signal;

Period and Power are the period and power values of the drive signal at the moment of impact; and Offset_max is the impact prevention limit parameter.

The Offset impact prevention limit parameter can also be calculated by adding to the Offset_max value a component ΔSafety which is a constant corresponding to the safety distance between the maximum displacement amplitude of the piston and the cylinder head.

The position-detecting circuit and the impact-detecting circuit of the piston may be integrated into a same sensor circuit.

The control circuit may comprise a memory storing at least some parameters of the displacement and impact signals and of the drive signal, and the parameter values calculated by the control circuit. This control circuit preferably increases the drive signal of the motor if the result of comparison shows that the displacement signal is within an anti-impact safety operating area, and reduces the drive signal of the motor if the result of the comparison shows that the displacement signal is outside an anti-impact safety operating area.

The objectives of the invention may also be achieved by means of a linear compressor control method having a piston driven by a linear motor and displacing within a cylinder, a position-detecting circuit that emits a signal indicating displacement of the piston inside the cylinder, and an impact-detecting circuit of the piston with the cylinder head, wherein the method comprises the following steps:

(a) carrying out the fine-tuning routine of the linear compressor that comprises:

- detecting an impact of the piston with the cylinder head;
- measuring the drive signal at the moment of impact between the piston and the cylinder head;
- measuring the displacement signal (SD) at the moment of impact between the piston and the cylinder head;
- calculating an impact prevention limit parameter based on the measured values of the drive signal and the displacement signal (SD) upon impact of the piston with the cylinder head;

(b) carrying out a control routine of the linear compressor that comprises the steps of:

- measuring the drive signal and the displacement signal (SD);
- calculating a limit value that a control parameter of the displacement signal (SD) can assume without impact between the piston and the cylinder head, based on the drive signal measured and the impact prevention limit parameter calculated in the fine-tuning routine, and determining an anti-impact safety operating area for the control parameter of the displacement signal (SD);

comparing the measured value of the control parameter of the displacement signal (SD) with the limit value calculated of the control parameter of the displacement signal (SD);

if the measured value of the control parameter of the displacement signal (SD) is within the anti-impact safety operating area, vary the drive signal to increase the efficiency of the linear compressor;

if the measured value of the control parameter of the displacement signal (SD) is outside the anti-impact safety operating area, vary the drive signal to reduce the efficiency of the linear compressor, detecting where there was an impact of the piston with the cylinder head, and in the event of impact, execute the fine-tuning routine to recalculate the anti-impact fine-tuning variable, and in the event of no impact, execute the control routine.

The control parameter of the displacement signal calculated in the method of the present invention is the variation value or the derivative value from the displacement signal (SD). This limit parameter is calculated by the equation $$\text{SLOPEmin}=K1\times\text{Period}+K2\times\text{Power}-\text{Offset\_max}$$

wherein:

Slope_min is the variation value or the derivative value from the displacement signal (SD) at the moment of impact;

K1 and K2 are respectively period and power offsetting constants of the drive signal;

Period and Power are the period and power values of the drive signal at the moment of impact; and Offset_max is the impact prevention limit parameter.

The Offset impact prevention limit parameter can also be calculated by adding to the Offset_max value a ΔSafety component which is a constant corresponding to the safety distance between the maximum displacement amplitude of the piston and the cylinder head. Additionally, the Offset impact prevention limit parameter can be calculated using the arithmetical average of at least three Offset values calculated at three different times.

Under the control method according to the invention, the step of calculating a limit value that a control parameter of the displacement signal (SD) can assume without impact between the piston and the cylinder head comprises calculating the derivative SLOPE_lim of the displacement signal (SD) by the equation $$\text{SLOPE\_}lim=K1\times\text{Period}+K2\times\text{Power}-\text{Offset}$$

and the step of comparing the measured value of the control parameter of the displacement signal (SD) with the limit value of the control parameter of the displacement signal (SD) comprises comparing the measured value Slope_measured of the derivative of the displacement signal (SD) with the calculated SLOPE_lim value; and the step of varying the drive signal to increase the efficiency of the linear compressor comprises increasing the voltage of the drive signal; and the step of varying the drive signal to reduce the efficiency of the linear compressor comprises reducing the voltage of the drive signal.

The method of the invention may also comprise a step of acquiring signals indicating the operating conditions of the compressor, which are considered in the step of varying the drive signal, and a step of storing at least some of the values of the signals generated by the control circuit, the values of the signals fed to the control circuit and the values of the parameters calculated by the control circuit. Furthermore, under the method of the present invention, the variation of the displacement signal (SD) is measured in a time interval in which the amplitude of the displacement signal (SD) varies between a pre-determined reference value and zero.

The objectives of the invention are also achieved by a system for controlling a linear compressor, which comprises means for controlling the operation of the linear compressor based on the displacement signal (SD) of a piston inside a cylinder of the compressor, and on an impact signal (SI) of the piston with a cylinder head, the means for controlling the operation of the linear compressor calculates, based on the displacement (SD) and impact (SI) signals, at least an impact prevention limit parameter for the displacement signal (SD), which is proportional to the variation of the displacement signal (SD) at the moment of impact, defining an anti-impact safety operating area of the linear compressor based on this parameter.

Alternatively, the means for controlling the operation of the linear compressor compares the displacement signal (SD) generated in response to a drive signal with the impact prevention limit parameter, and adjusts the drive signal of the motor based on the result of the comparison. The control parameter of the displacement signal (SD) is preferably the variation value or the derived value from the displacement signal (SD).

Finally, the objectives of the invention are also achieved by a linear compressor control method, which controls the operation of the linear compressor based on the displacement signal (SD) of a piston inside a cylinder of the compressor, and on an impact signal (SI) of the piston with a cylinder head inside a cylinder, and during the control of the operation of the linear compressor, the method comprises a step of calculating, based on the displacement (SD) and impact (SI) signals, at least an impact prevention limit parameter for the displacement signal (SD), which is proportional to the variation of the displacement signal (SD) at the moment of impact, and defining an anti-impact safety operating area based on this parameter.

The method may comprise a step of comparing the displacement signal (SD) generated in response to the drive signal with the impact prevention limit parameter, and adjusting the drive signal of the motor based on the result of the comparison. The control parameter of the displacement signal (SD) may be the variation value or the derivative value from the displacement signal (SD).

SUMMARIZED DESCRIPTION OF THE DRAWINGS

The present invention will next be described in greater detail based on an example of execution represented in the drawings. The drawings show:

Figure 4:
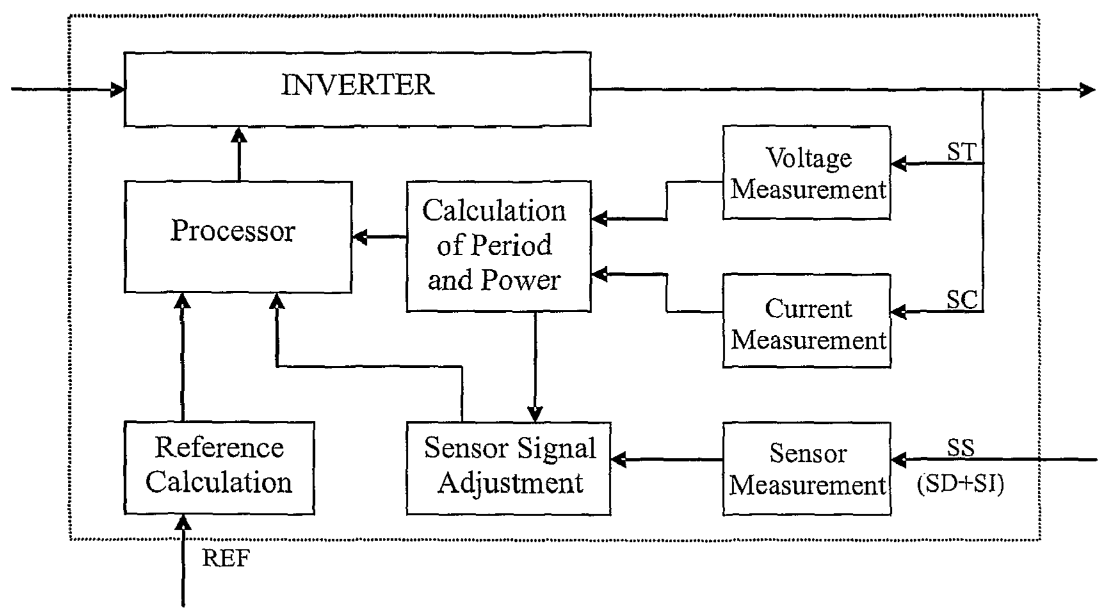
Figure 5:
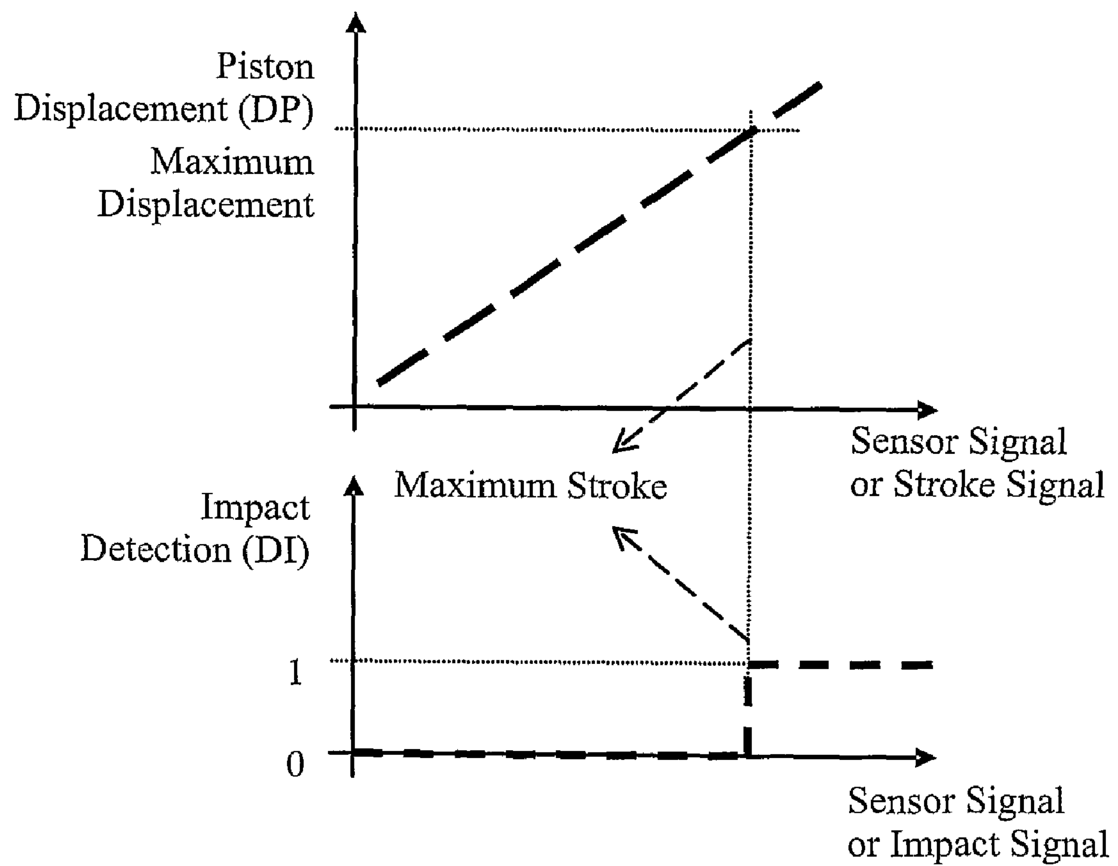
Figure 6:
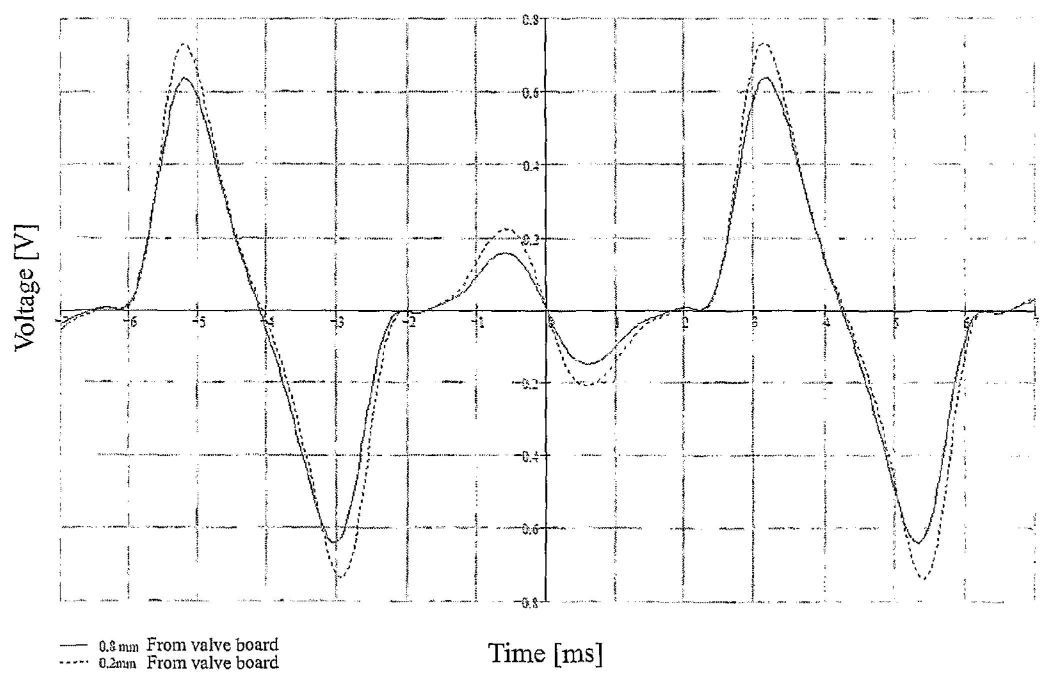
Figure 7:
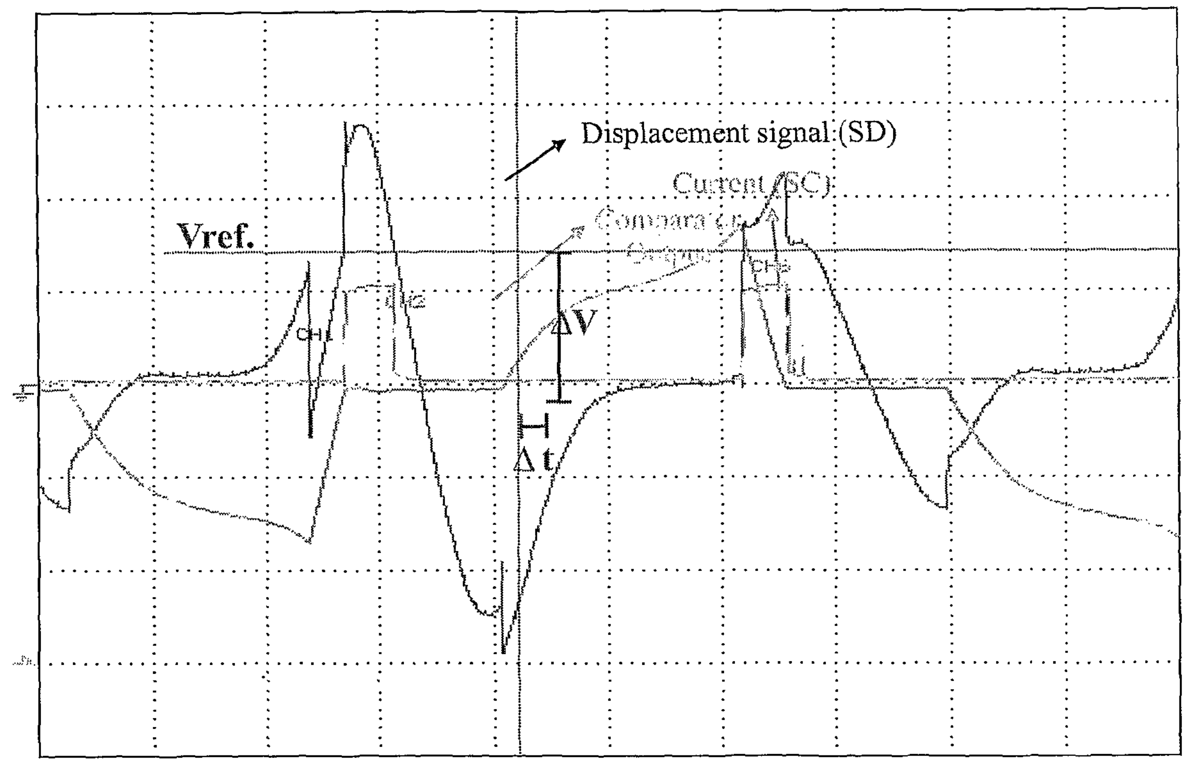
Figure 8:
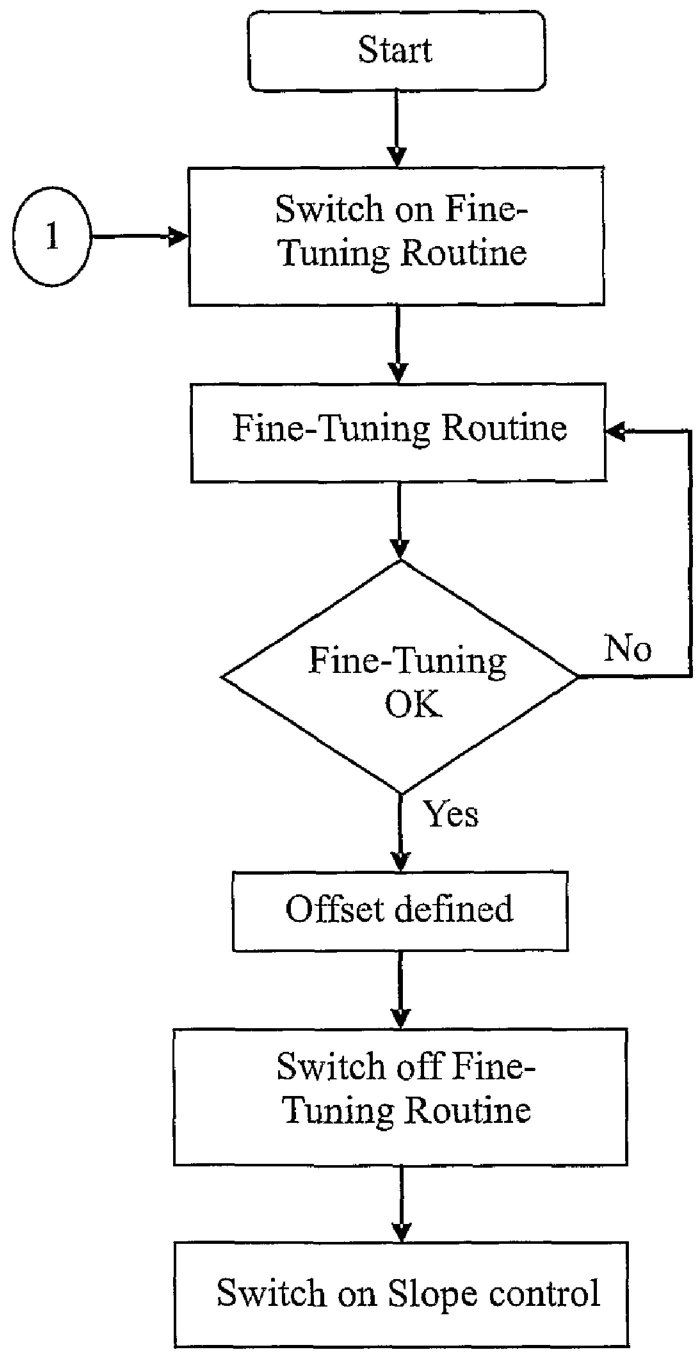
Figure 9:
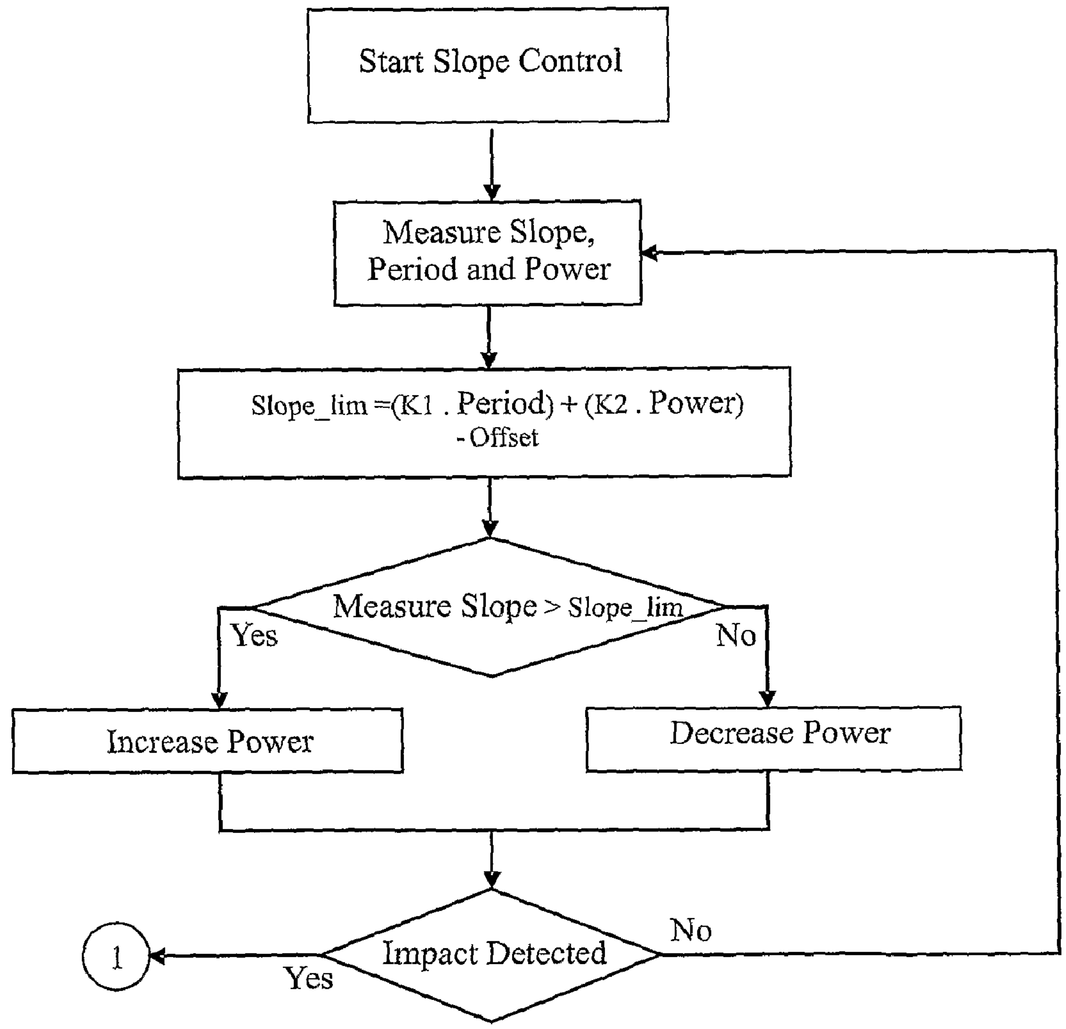
Figure 10A:
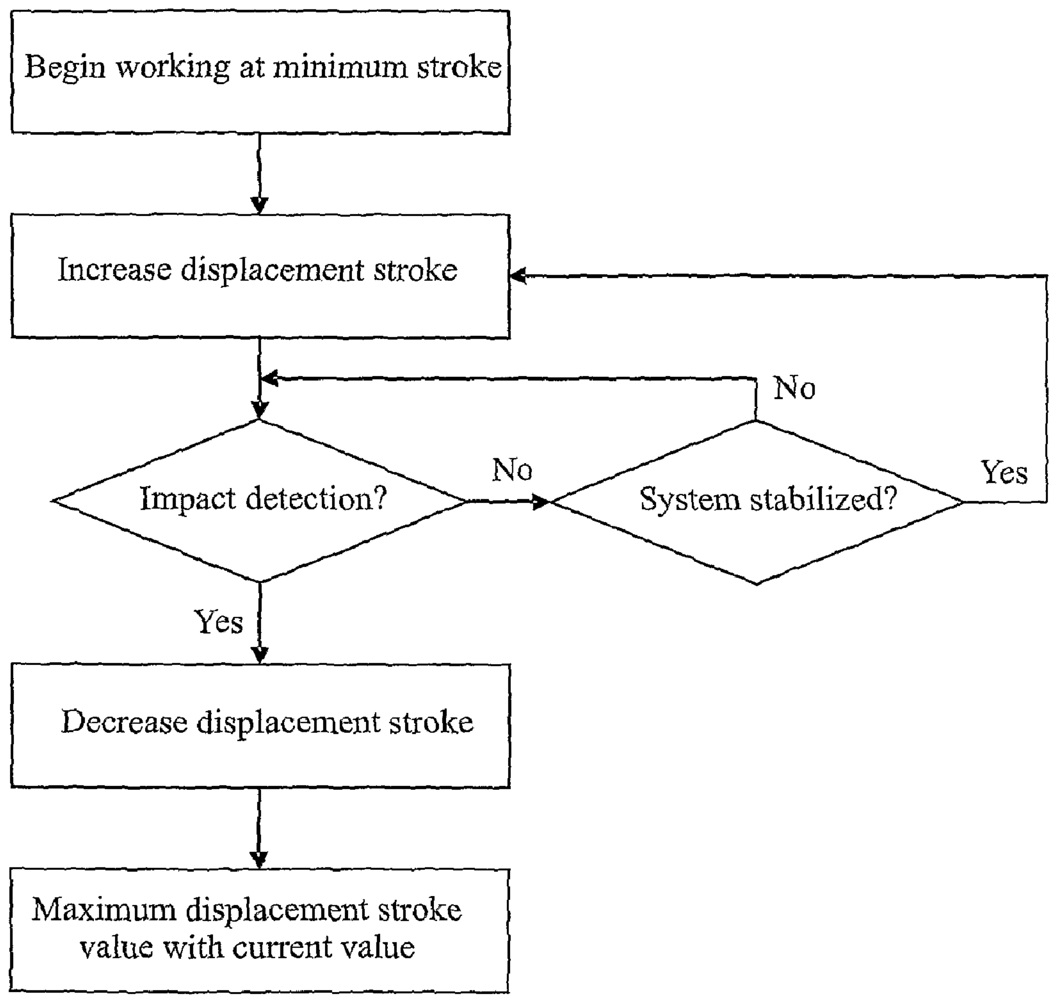
Figure 10B:
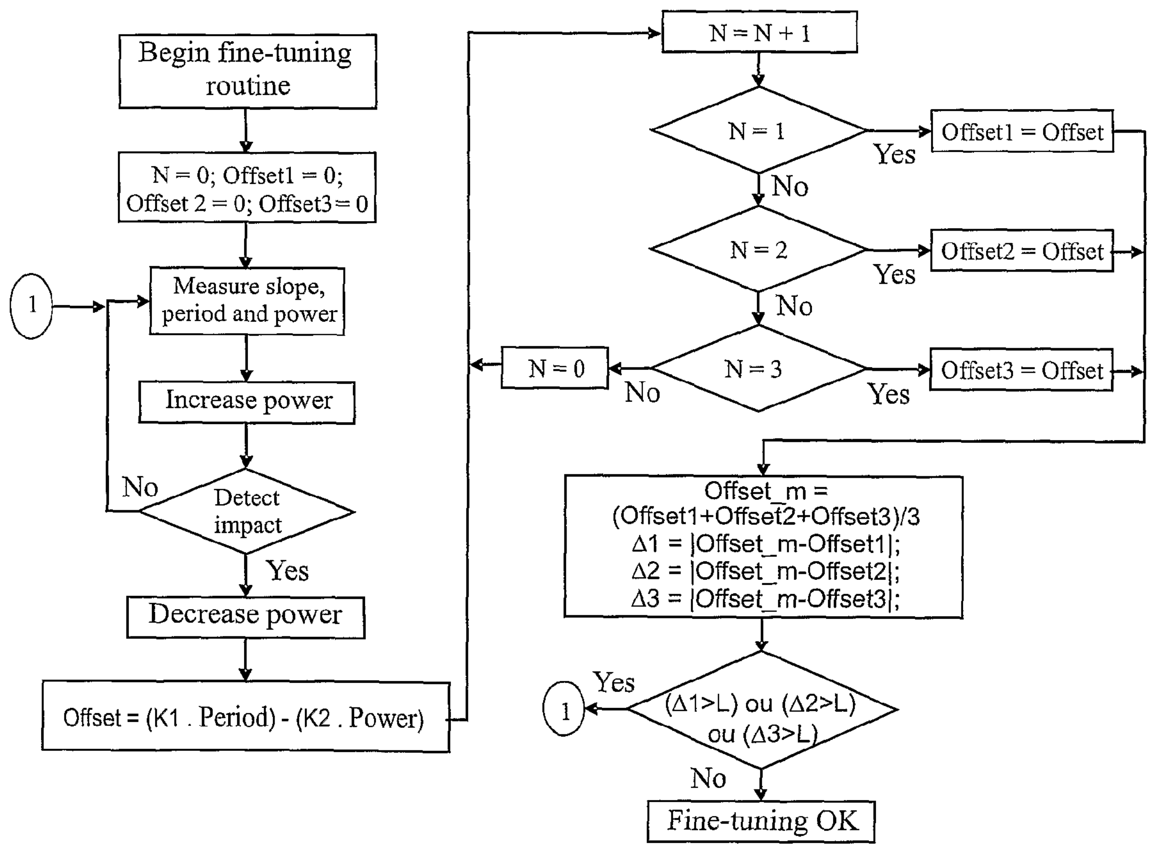
Figure 11:
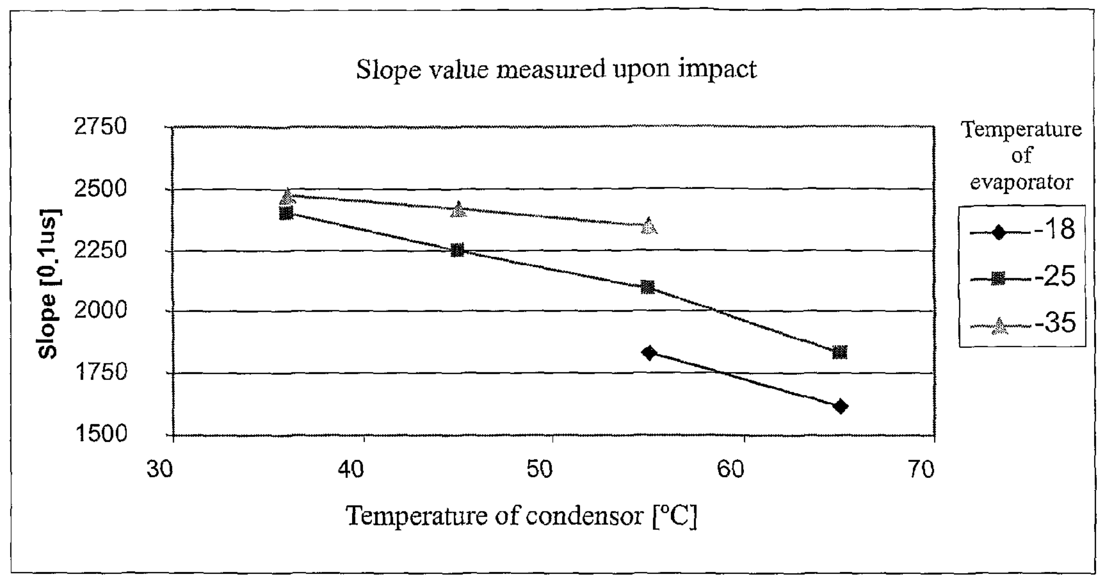
Figure 12:
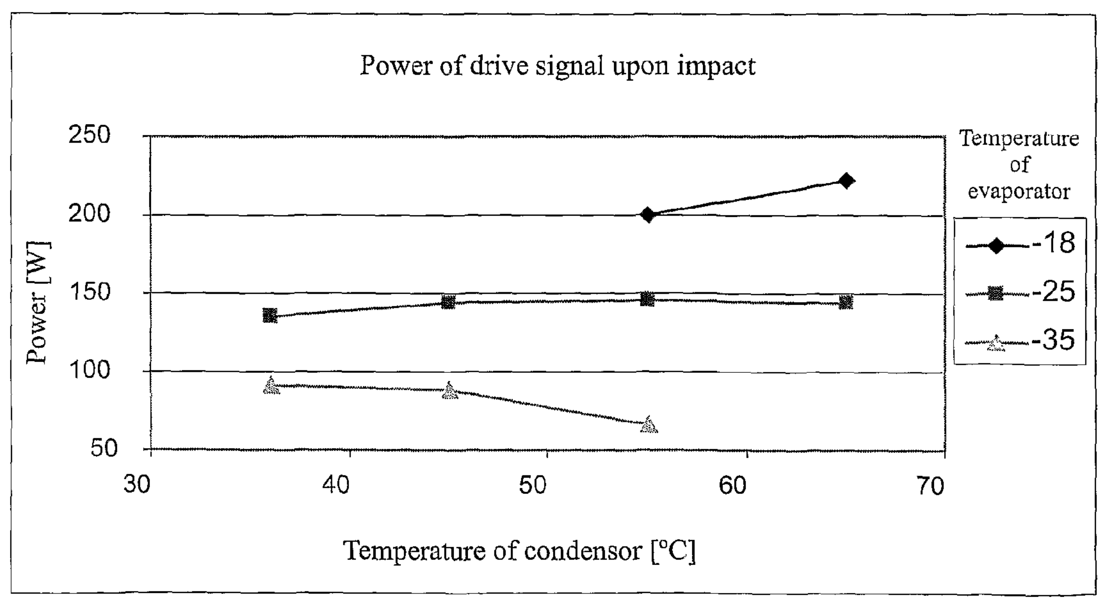
Figure 13:
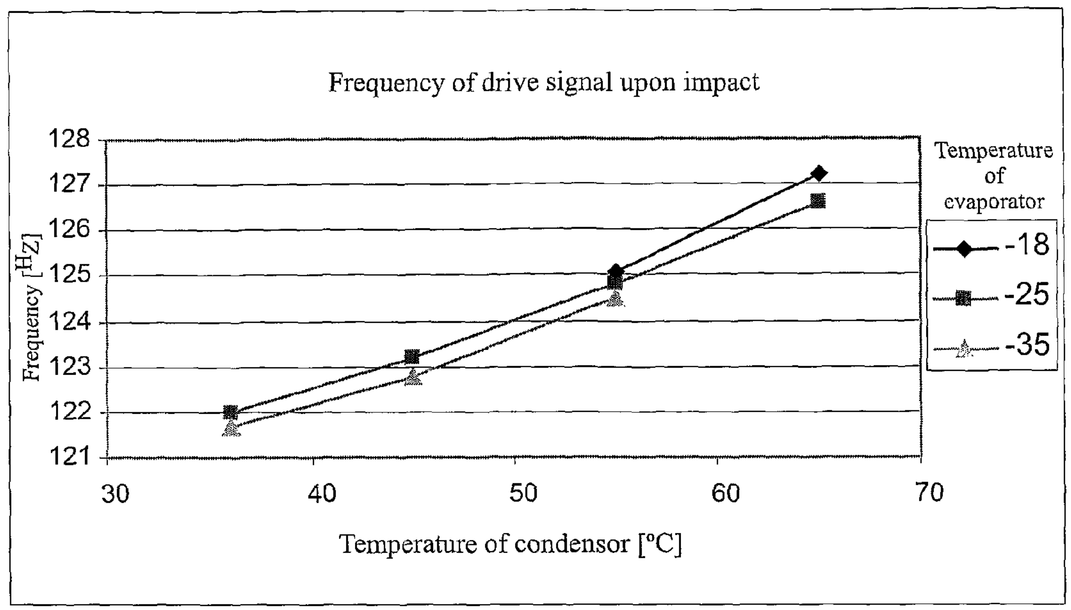
Figure 14:
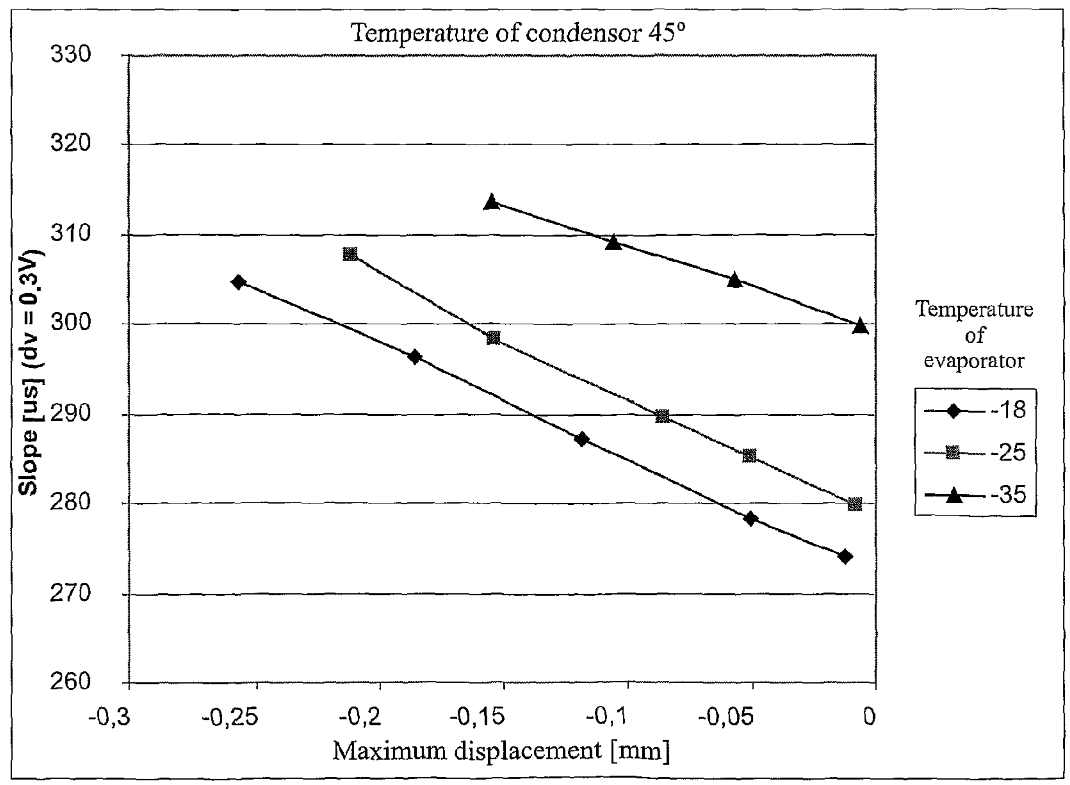

FIG. 4 a block diagram of a preferred embodiment of the control circuit of the system of the present invention;

FIG. 5 is a comparative representation of the behavior of the impact determination signal DI and the piston position determination signal DP;

FIG. 6 is a comparative representation of the displacement signal of the piston SD, for two different displacement amplitudes of the piston;

FIG. 7 is a representation of the behavior of the displacement signal generated by the circuit for detecting the piston position, the compressor current signal, and the comparator signal;

FIG. 8 is a flowchart of a part of the linear compressor control method of the present invention showing the flow of the fine-tuning routine with the piston operation control routine;

FIG. 9 is a flowchart of the piston operation control routine of the method of the present invention;

FIG. 10A is a flowchart of a first embodiment of the fine-tuning routine of the method of the present invention;

FIG. 10B is a flowchart of a second embodiment of the fine-tuning routine of the method of the present invention;

FIG. 11 is a graph showing the slope values of the displacement signal at the impact limit in various operating conditions of the compressor;

FIG. 12 is a graph showing the power variation of the drive signal at the moment of impact, for different temperature conditions of the condenser and the evaporator;

FIG. 13 is a graph illustrating the frequency variation of the drive signal at the moment of impact, based on different temperature conditions of the condenser and the evaporator;

FIG. 14 is a graph illustrating the relationship between the maximum displacement achieved by the piston and the slope of the displacement signal, under different temperature conditions of the evaporator.

Figure 15:
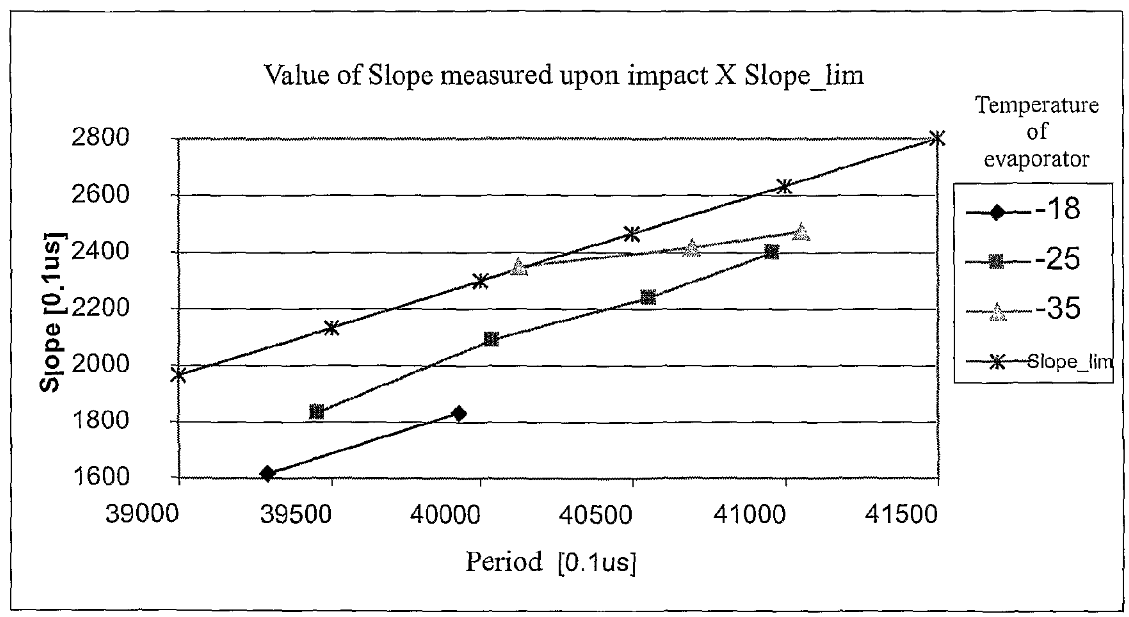

FIG. 15 is a graph illustrating a correlation between the period of the drive signal and the displacement signal SD, at the impact limit of the piston with the cylinder of the compressor.

DETAILED DESCRIPTION OF THE DRAWINGS

Figure 1:
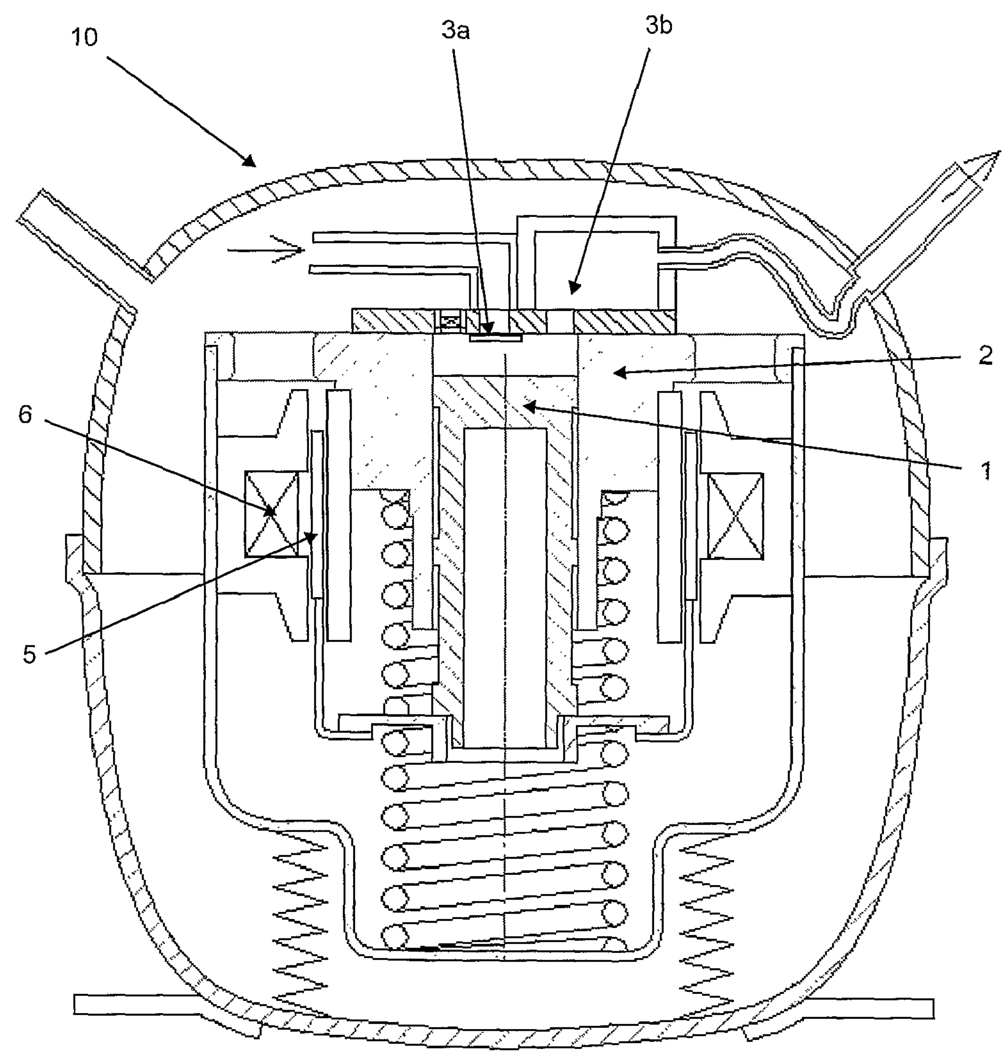
FIG. 1 is a cross-sectional view of a compressor to which the system for controlling a linear compressor according to the present invention is applied.

The linear compressor 10 control system according to the invention is applied to a compressor having a piston 1 that dislodges reciprocatingly inside a cylinder 2, approaching and moving away from the cylinder head, and the motion of the piston is driven by a linear motor. An example of a linear compressor to which the control system of the present invention is applied is illustrated in FIG. 1.

The piston is coupled to at least a magnet 5, such that the displacement of the piston causes a corresponding displacement of the magnet and vice-versa.

The actuator of the piston and cylinder combination is comprised of at least a linear motor coil 6, electrically powered in order to produce a magnetic field. The motor coil must be disposed such that the magnetic field generated thereby acts on the magnet 5 of the piston 1, making it displace in response to the variation of this magnetic field.

Therefore, when the motor coil is electrically powered, it generates a magnetic flow that can be variable and controlled, in accordance with the power voltage. The variation of the magnetic field generated by the motor coil as a result of the voltage applied thereto induces the magnet 5 to dislodge reciprocatingly, making the piston displace in the same proportion. The piston operating amplitude corresponds to the total displacement, also referred to as piston 1 stroke inside the cylinder 2.

To obtain the maximum pumping capacity of the piston and cylinder combination, it is necessary to operate at an amplitude wherein the piston approaches as close as possible the cylinder head which has a valve board 3*a*, 3*b*, but without collision between the piston and the cylinder head. For this to be possible, the piston operating amplitude must be known precisely. The larger the estimated error of this piston displacement amplitude, the greater the safety distance will have to be between the piston and the valve board to avoid collision, thus reducing the stroke of the piston and consequently its performance. This collision is undesirable, as it causes a loud noise, and may damage the equipment.

This is why a circuit for detecting the piston position of the control system according to the invention performs the recognition of the position of the piston 1, to enable the combination to operate with the largest possible operating amplitude, optimizing the pumping capacity of the piston 1 and the cylinder 2. Additionally, as demonstrated ahead, it is advantageous that the system knows the piston displacement amplitude to control whether the compressor is operating in the load condition required by the cooling system in each period of time.

In a preferred embodiment of the invention applied to the compressor 10 of FIG. 1, the circuit for detecting the piston position comprises an inductive sensor 8 arranged on a point of the displacement stroke of the magnet 5 connected to the piston 1. Thus, the inductive sensor 8 is subject to the magnetic field variations produced by the magnet 5 resulting from its displacement, both in terms of velocity and its position. The circuit for detecting the piston position emits a displacement signal SD, in response to the magnetic field variation noted, which has a format so as to permit the identification of the moment at which the piston has reached its maximum operating amplitude, and also the maximum position achieved.

In a preferred embodiment of the invention, the inductive sensor 8 is preferably embodied in the form of a simple coil, referred to herein as sensor coil, preferably narrow towards the displacement of the magnet, and elongated transversally towards the displacement of the magnet. So that the sensor 8 detects the precise piston control position, it should preferably be positioned inside the displacement stroke of the magnet, exactly in the position attained by the lower edge of the magnet 5, when the piston attains control position (maximum operating amplitude) as close as possible to the cylinder head, but without collision.

The displacement signal SD of the piston generated by a detection circuit or a displacement sensor assumes a form of pulses, as can be seen in FIG. 6, which illustrates the wave form of the displacement signal for two different operating conditions of the compressor. The section of the signal SD between the positive and negative peaks is approximately linear. It is in this linear section that the system and the method according to the invention measure the derivative of signal SD, to calculate the maximum displacement position of the piston.

Based on FIG. 6, it can be noted that certain parameters of the sensor signal vary, depending on the length of the piston displacement stroke. In FIG. 6, the signal represented in dotted lines corresponds to a situation in which the piston operates with the more reduced displacement stroke, achieving a minimum distance from the cylinder head of approximately 0.8 mm, when at maximum position inside its displacement stroke. The signal represented in solid lines corresponds to a piston operation with a greater operating amplitude, in which the piston reaches a minimum distance of 0.2 mm from the cylinder head, when it reaches its maximum position inside its displacement stroke.

Note, therefore, that the bigger the piston displacement stroke, the larger the amplitude of the piston displacement signal. However, the wave form of the signal is essentially the same for any operating amplitude of the piston, principally in terms of frequency. The absolute and relative maximum and minimum points of the displacement signal SD, as well as the points in which the signal SD crosses the horizontal axis, when the signal voltage is equal to 0, occur in the same time instant for both the displacement signals in the two different operating conditions.

In the preferred embodiment of the present invention which uses the inductive sensor 8 to measure the position of the piston, the slope of the displacement signal of the piston is the parameter by which the piston displacement amplitude will be calculated. This slope is no more than the variation of the signal amplitude in an interval of time, or a derivative of this signal in this interval. To measure the derivative of the displacement signal SD, it is possible to measure its voltage value for a fixed time, or measure the time for a fixed voltage, or also take simultaneous readings of voltage and time and calculate the derivative. In an alternative embodiment of the invention, the displacement signal SD could also be fed to an AD converter and instead of measuring the derivative in an interval of time, the displacement signal SD in x points of time would be measured, and then the average measurements would be calculated to find the derivative.

This variation or slope parameter of the displacement signal SD is also used by the method and system of the present invention to check whether the piston is operating inside its safety area, avoiding collisions, and to calculate the safety distance between the piston and the cylinder head, when the compressor is operating at maximum load, in which the piston displacement stroke should be as great as possible.

The derivative of the signal is measured on the linear section between the positive and negative peaks. So the larger the amplitude of the piston displacement, the larger the derivative of the measured signal will be, because the more rapid the variation of the signal SD should be in varying from maximum point to an amplitude equal to 0, given that the signal frequency does not change in function of the piston operating amplitude. Hence it can concluded that the variation of the displacement signal, or its derivative, over an interval of time is also proportional to its operating amplitude, and indicative of its position. For example, when the displacement signal attains its maximum and minimum points, this means that the piston respectively attained the position nearest to and furthest from the cylinder head, that is, the maximum amplitude points of its displacement stroke. At these points, the derivative of the displacement signal is equal to 0.

The use of an inductive sensor 8 of the kind described herein is advantageous, because its elongated shape allows a greater voltage of the displacement signal SD generated by the sensor coil to be obtained without interfering with the sensor position resolution.

Accordingly, there is a greater variation of the signal generated by the sensor on account of a significantly reduced displacement of the piston inside the cylinder, which increases the resolution of the sensor and decreases the system's susceptibility to errors due to noise disturbance. This configuration of the sensor 8 also has low impedance, which provides a signal free of electrical noise, further contributing to the good precision of the sensor.

However, the present invention is not limited to the use of this sensor. It is possible to apply any other kind of sensor that measures the position of the piston inside the cylinder.

The control system according to the invention also has an impact-detecting circuit of the piston with the cylinder head, which generates an impact signal SI indicating the occurrence or not of impact of the piston with the cylinder head. This impact signal can be generated in many different ways, without departing from the scope of protection of the present invention. The signal SI can be produced both by means of a routine without sensor, by means of processing the electrical signals generated by the compressor and its motor, and based on a sensor signal.

When the impact-detecting circuit detects impact of the piston with the cylinder head, the impact signal SI sent thereby assumes a shape indicative of impact. Impact detection can be carried out by the same sensor that detects piston displacement, or also by an additional sensor applied to the piston and cylinder combination, designed exclusively to detect impact. In another embodiment of the invention, impact detection can be performed by analyzing the electrical signals emitted by the compressor itself.

In an embodiment of the invention, the impact-detecting circuit and the position-detecting circuit are independent circuits which general independent signals. Generally, certain types of sensors used to realize the present invention, as well as signal processing circuits that process the impact signals SI and displacement signals SD sent by the sensor are already known in the prior techniques cited above. However, the techniques for processing signals differ from those taught in these documents of the state of the art, especially by virtue of the fact that the present invention combines a control technique of compressors without a sensor and a control technique of compressors with the aid of a sensor, which is not proposed by any of the documents cited from the state of the art.

Figure 2A:
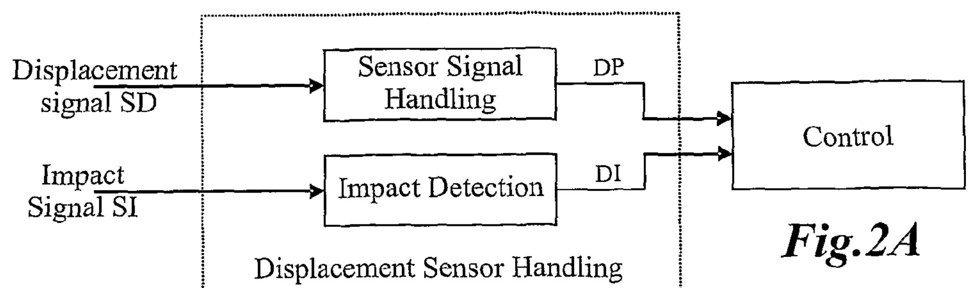
FIG. 2A is a block diagram of a part of the control circuit used to implement the method and the system according to the present invention, which receives piston displacement and impact signals.

In a preferred embodiment, said circuits and systems can be implemented based on the technique described in document WO 2005/71265, incorporated herein by reference. In this case, as shown in FIG. 2A, two different signals are sent to a control circuit, the displacement signal SD being generated by the circuit with a sensor, and an impact signal SI being generated by the circuit without a sensor. These two signals are treated separately inside the control circuit.

In another embodiment of the invention, the impact detection and piston position detection circuits may be housed in a single sensor circuit which performs the two functions simultaneously. This union of the two position and impact detection circuits can be carried out by means of piezoelectric (PZT) sensor disposed in the piston head. A sensor of this kind can be seen, for example, in document WO 2004/104419, incorporated herein by reference. As described, this sensor is an accelerometer that measures the acceleration of the piston during its displacement and generates a substantially sinusoidal output signal of essentially low frequency. The PZT sensor is comprised of crystals, such that when there is a collision between the piston and the cylinder, the sensor crystals are compressed causing a deformation of the acceleration signal of the piston generated by the sensor, in the form of a component in high frequency on a maximum point of the signal.

Figure 2B:
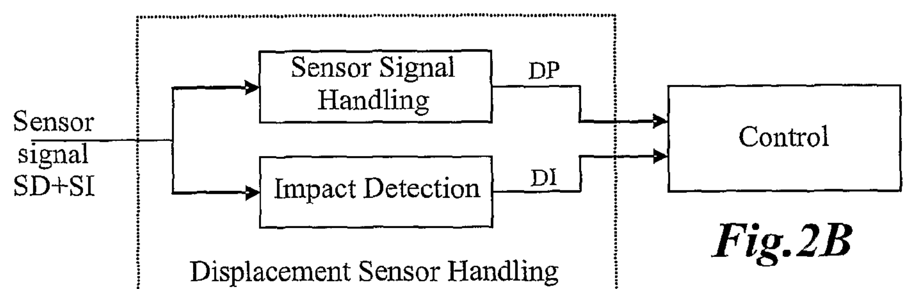
FIG. 2B is a block diagram of a second embodiment of the part of the control circuit used to implement the method and the system according to the present invention, which receives piston displacement and impact signals.
Figure 3:
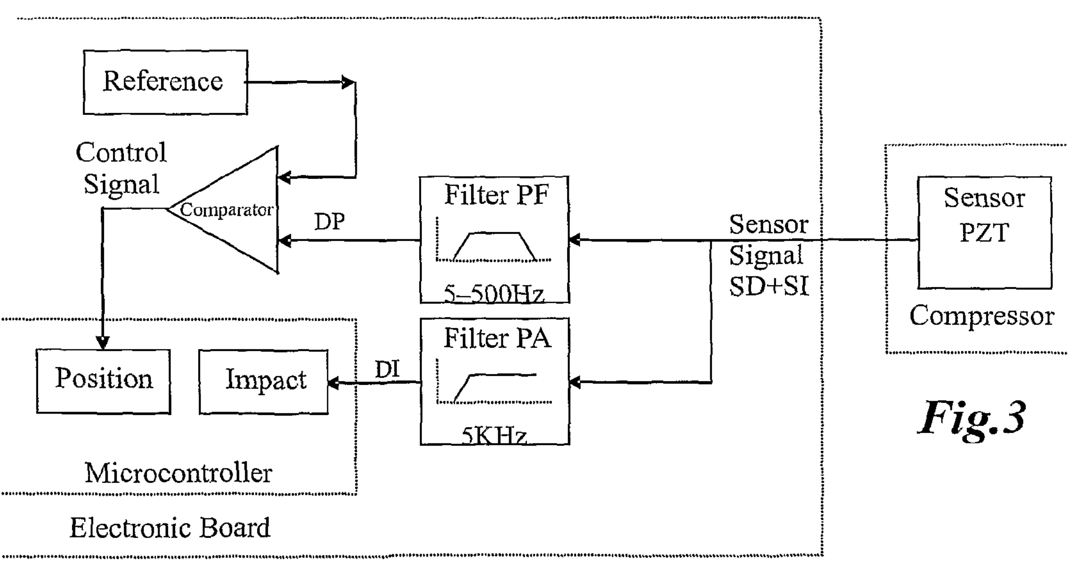
FIG. 3 is a more detailed representation of the embodiment of the control circuit used to implement the method and the system according to the invention illustrated in FIG. 2B.

This second embodiment of the invention is shown in FIG. 2B, in which only one sensor signal is sent to the control circuit, containing both the displacement SD and impact SI information. This signal is applied to two separate handling circuits which process the signal and separately extract the information on position and on impact. FIG. 3 is a more detailed illustration of the separate processing of the PZT sensor signal and is described in further detail ahead.

The impact signal SI is fed to the control circuit, which processes this signal, by means of an impact-detecting circuit, and directly generates an impact determination signal DI. The SD signal is sent to a signal handling circuit of the sensor which processes this signal and extracts the information on position and amplitude of the piston operation in function of its wave form, and may generate, for example, a position determination signal DP.

FIG. 5 illustrates an example of position determination signals DP and impact determination signals DI generated after interpreting and processing the displacement SD and impact SI signals in the control circuit, which can be applied to the present invention, and which are described in document WO 2005/71265. The impact determination signal DI, in this case, is generated in binary form. When no impact is detected, the value of the signal is equal to 0 volt. When impact occurs, the signal sent by the sensor becomes, for example, equal to 1 volt, forming a square wave. At the same instant in time, the value of the DP signal is proportional to the maximum displacement of the piston.

To control the operation of the piston, the control circuit of the system according to the invention sends a control signal to an inverter, which in turn applies the drive signal to a linear motor. This linear motor produces the motion of the piston in the compressor. The drive signal applied to the motor of the linear compressor may be varied both in voltage or power, as in frequency or period, in function of the working conditions in which the compressor should operate. The frequency and the power of the drive signal determine the oscillatory motion of the piston.

FIG. 4 shows a block diagram of a preferred embodiment of the control circuit. The control circuit is connected to the output of the position-detecting circuit and to the output of the impact-detecting circuit, and receives the SI impact detection signal and the SD position detection signal of the piston generated by the respective detection circuits. The control circuit also receives the drive signal from the linear motor in the form of a voltage signal ST and a current signal SC.

The control circuit comprises data-processing means which process the displacement signal SD of the piston and the impact signal SI, or derivative signals thereof, and generate a control signal of the inverter. The data-processing means have a data processor, which may be, for example, a microcontroller, and are responsible for the steps of processing the data and for the generation of the control signal of the inverter.

The control circuit is capable of performing a fine-tuning routine of the motion and the maximum stroke of the piston. In this routine, the control circuit analyzes the displace signals SD and/or impact signals SI jointly with the drive signal of the linear motor, and by means of certain mathematical equations calculates the maximum displacement possible which the piston can perform (maximum operating amplitude), without colliding with the cylinder head, and using a significantly reduced safety margin against collision.

Additionally, the processor of the control circuit calculates the values or value ranges that at least a parameter of displacement signals SD and/or impact signals SI should assume when the piston is working to prevent collision with the cylinder, when operating at maximum operating amplitude, or to guarantee that the piston is operating with suitable displacement amplitude for the load requested by the compressor.

The control circuit is also capable of executing an impact detection step, in which, in a preferred embodiment of the invention, it analyzes the impact signal SI generated by the impact-detecting circuit, and identifies whether impact occurred between the piston and the cylinder head.

The control circuit also performs a piston operation control routine in which it identifies the piston displacement amplitude and recognizes whether or not impact occurred between the piston and the head, based on the format or on the value of the displacement signal SD in isolation, or in combination with the data of the drive signal of the linear motor or with the data of a cooling circuit to which the compressor is applied. Recognition of the occurrence of impact is performed by comparing piston displacement data readings at a certain moment with the values calculated in the fine-tuning routine to prevent collision with the cylinder.

As can be seen in FIG. 3, in order to perform these functions of control and fine-tuning of the piston, the control circuit comprises at least a signal comparator, designed to compare the displacement signal SD with the values of certain parameters that this signal should assume calculated in the fine-tuning step. The comparator receives, therefore, the displacement signal SD in an input, and the signal REF with the reference value of at least one parameter in another input, and generates an output signal indicating that the displacement signal is within or outside the range of values that it can assume. The reference signal preferably informs the reference voltage value which will be used in calculating the derivative of the displacement signal SD. The output signal of the comparator is fed into the processor, as shown in the block diagram in FIG. 3.

Performing this fine-tuning routine in association with the impact detection routine allows the use of low precision position and impact sensors, because this low precision is offset by the increased precision provided by the combined use of these two technologies of detecting impact with a sensor and without a sensor.

The processor also receives data relating to the operating conditions of the compressor itself and/or of the equipment to which the compressor is applied. Here, we shall consider that the compressor is applied to the cooling circuit of a cooler, for purposes of understanding the workings of this compressor control system jointly with the equipment to which the compressor is associated.

The processor of the control circuit may, in this case, receive data from an evaporator, pressure control elements, condenser, temperature sensors or any other elements that make up the cooling circuit of the cooler. The data received by the processor comprise, for example, the input current, power, feed voltage, power factor and ohmic resistance of these devices of the cooling circuit, sensor signals indicating the temperature of the cooled environment, among others. By means of these signals, the control circuit determines the load and operating conditions in which the compressor should work. This information is important, due to the fact that the sensor signal significantly varies in function of the load and operating conditions of the compressor (for example, the temperature of the evaporator and the condenser), as can be seen in the graphs of FIGS. 11 to 15. Hence, the control system according to the invention may interpret the signal of the sensor in conformity with the operating conditions of the compressor, and control the compressor so that it operates in a coherent manner with the conditions required by the cooler, but without collision between the piston and the cylinder head.

In the embodiment of the invention in which use is made of a sensor as discussed in WO 200571265, and scheme illustrated in FIG. 3 using a PZT-type sensor, which sends in a same signal the information on piston position SD and piston impact SI, the PZT sensor signal should first be subject to handling to extract separately the information on position and on impact of the piston, generating two different signals, each containing one type of information only.

To perform this handling, two filters can be used, to which the PZT sensor signal is fed. Preferably, the PZT sensor signal is applied to a band-pass filter, which filters the signal in a frequency range, for example, from 5 to 500 Hz. The signal filtered through the band-pass filter corresponds to the piston positioning signal. The PZT sensor signal is simultaneously also applied to a high-pass filter which filters the signal in a frequency range over 5 KHz. The signal filtered through the high-pass filter corresponds to the piston impact signal. The displacement signal SD of the piston is then fed to the comparator, whereas the impact signal SI is fed directly to the processor.

The data relating to the displacement SD and impact SI signals, such as voltage, current and frequency, as well as the data of the equipment to which the compressor is applied, for example, the cooler, and which are acquired by the processor, are stored by the control circuit, preferably in an internal memory of the circuit. The data on voltage and operating frequency of the motor are also stored in this memory not illustrated in the drawings.

The present invention also discloses a method of fine-tuning and controlling a linear compressor, which can be used in compressors applied to coolers, air-conditioning appliances, or sometimes to fluid pumps. The system according to the invention described previously can be used according to the methodology described below.

This method is capable of fine-tuning the operation of the linear compressor, so that it operates at its maximum capacity, with the piston in a largest possible operating amplitude without colliding with the cylinder head. The fine-tuning can be performed whenever necessary, for example, when an operating failure is detected in the equipment to which the compressor is applied, or when it is identified that the compressor is operating below its maximum capacity, or that the piston is colliding with the cylinder, or whenever the compressor or the equipment to which it is applied is switched on. A periodic fine-tuning can be established at a predefined time. This time will be established pursuant to the characteristics of the position-detecting circuit.

This kind of fine-tuning is not normally possible in compressors of the state of the art which, generally speaking, allow for fine-tuning only when they are manufactured.

The method of the invention comprises a first step of applying the drive signal to a linear motor, which drives a piston that dislodges reciprocatingly inside a cylinder, in a compressor. The drive signal of the motor determines the velocity and amplitude of the piston operation of the compressor, which should be varied in function of the operating load of the compressor, and temperatures of the evaporator and the condenser. The parameters of frequency or period and amplitude of the drive signal of the linear motor are measured and preferably stored in a memory.

Soon after starting up, preferably the method of the invention performs a fine-tuning routine of the compressor. The fine-tuning routine of the compressor is performed mainly to detect in what piston operating amplitude collision occurs, to guarantee that the compressor will always operate under safe conditions, and avoid collision, and subsequent wear and tear of the equipment and acoustic noise. Generally, this routine is performed when the compressor is switched on, but it can also be carried out when there is a change in the operating and load conditions of the compressor, or to correct instabilities in the system, among others. This routine of the method of the present invention is illustrated in the flowchart in FIG. 9.

When the fine-tuning routine is executed, for example, when the compressor equipment is switched on, the working of the piston is initiated, with the piston functioning in its minimum operating amplitude. Then, a step of measuring the piston displacement amplitude is performed, as is a step of detecting impact of the piston with the cylinder head.

The impact detection step can be carried out by an impact sensor which is applied to the piston and cylinder combination and which generates a signal when there is an impact of the piston with the cylinder head. When this sensor detects an impact of the piston with the cylinder head, the impact signal SI sent thereby assumes a format indicating impact. If the system is not stabilized, this impact detection routine can be carried out again.

According to a preferred embodiment of the invention, the step of measuring the amplitude of operation of the cylinder is carried out with the aid of an inductive sensor 8 of the kind described above, which emits the displacement signal SD of the piston, whose derivative indicates the piston displacement amplitude. Thus, in this step of detecting the displacement of the piston of the fine-tuning routine, the derivative of the displacement signal SD is calculated on the linear section of this signal. This derivative is represented by the "Slope" variable, which is stored in a memory device.

If no impact of the piston with the cylinder head has been detected, a voltage of the drive signal applied to the linear motor is progressively increased in small amounts, causing a corresponding increase in the operating amplitude, or piston displacement stroke. For each voltage increase of the drive signal, a step of detecting impact and measuring the operating amplitude of the piston is performed.

Detecting impact and measuring the operating amplitude of the piston can be performed, preferably, once for every operating cycle of the compressor. The voltage and the frequency of the drive signal in each cycle can be duly stored.

As long as no impact between the piston and the cylinder head is detected, the steps of measuring the piston displacement amplitude and detecting impact are carried out successively, followed by a minor increase in the voltage of the drive signal.

When impact of the piston with the compressor is detected, then the voltage of the drive signal of the motor is slightly reduced. This new voltage value of the drive signal can be recorded as a new maximum voltage value of the drive signal, and the value of the displacement amplitude achieved by the piston is recorded as maximum displacement stroke value.

Additionally, the last value of the "Slope" variable corresponding to the derivative of the signal SD when impact occurred is attributed to a "SLOPEmin" variable, which identifies the value of the derivative of the signal SD when impact occurs. As mentioned previously, the displacement of the piston inside the cylinder depends on the period and power parameters of this drive signal.

The period or frequency and the power of the drive signal of the linear motor at the moment impact occurred are also known. These values are applied to equation I below, which relates the slope of the displacement signal SD with the frequency and the period of the drive signal, and calculates a parameter called Offset_max:

$$\text{SLOPE min}=K1\times\text{Period}+K2\times\text{Power}-\text{Offset\_max} \qquad \text{(equation I)}$$

As mentioned previously, the period and power values of the drive signal of the linear motor vary depending on the operating conditions of the compressor, such as the temperature of the evaporator and the condenser. Therefore, in equation I, it is necessary to adjust the period and power values to correct the distortions of the sensor signal, which is done by multiplying the period and power by the respective angular coefficients K1 and K2, which are experimental constants obtained at design phase with sensor tests. The "Offset" variable is a fine-tuning parameter of the sensor, which is proportional to the slope of the signal SD when impact occurs between the piston with the cylinder, in those power and period conditions of the drive signal. By applying the known values to the equation I, the Offset_max value is obtained, which will be used in the main routine of the compressor to prevent impact. The Offset_max value corresponds to a maximum value that the Offset parameter can assume, without applying any safety distance to avoid collision of the piston with the cylinder.

In an alternative embodiment of the invention shown in FIG. 10, this fine-tuning routine can be performed at least three times in a row, in order to obtain at least three different values of Offset calculated (Offset1, Offset2, Offset3) depending on the other variable readings. Then calculate the average value Offset_medio of the three Offset values measured, and calculate the difference between the average value Offset_medio and each of the values calculated between Offset1, Offset2 and Offset3, thus obtaining the values Δ1, Δ2, Δ3 corresponding to the module of each of these differences. The values Δ1, Δ2 and Δ3 are compared with a limit value L. If none of the values Δ1, Δ2, Δ3 is greater than L, then the fine-tuning is successfully concluded. If any of the values Δ1, Δ2, Δ3 is greater than L, then the fine-tuning of the compressor is resumed, and again three different Offset_max values are calculated. The parameter L used for fine-tuning the Offset_max value is a value determined in the design phase of the method according to the invention.

In an embodiment of the invention, the Offset_max value calculated by the methods above can be applied directly to the piston operation control routine without the need for additional fine-tuning.

According to another embodiment of the invention, after defining the Offset_max value according to any of the forms illustrated in FIGS. 9 and 10, a final Offset value is calculated, which is fine-tuned with a safety distance to avoid impact with the cylinder head. This final Offset value will be calculated by the formula II below, to which are applied the measured values of Slope_min, period and power of the drive signal used to calculate the Offset_max, and the already known K1 and K2 parameters:

$$\text{Offset}=K1\times\text{Period}+K2\times\text{Power}-\text{Slope\_min}-\Delta\text{safety} \quad \text{(equation II)}$$

The ΔSafety variable corresponds to a safety distance also defined in laboratory, which should be deducted from the piston operating amplitude in order to prevent the piston from colliding with the cylinder head. This final Offset value will be used for the piston operating control during the normal functioning of the compressor, with the aim of avoiding impact between the piston and the cylinder head.

After calculating the Offset value fine-tuned with the safety distance, and the slope value Slope_min of the displacement signal SD, the fine-tuning routine is switched off, and the compressor begins to operate normally, being controlled by the steps of the method of the present invention which carry out the compressor control so it operates with safety, without the occurrence of collisions, and/or with the desired working load, avoiding power wastage. The complete method according to the invention including the fine-tuning routine and the piston operation control routine is illustrated in FIG. 8 combined with FIG. 9.

After switching off the fine-tuning routine, the piston operation control routine starts, also referred to as the Slope control routine of the displacement signal SD. In this routine, the Slope values of the displacement signal SD, and the power and period values of the drive signal are measured periodically, while the compressor is in operation, preferably once for every cycle of the compressor, or at greater intervals. The period and power values are applied to the equation III below, which is similar to equation I, but already uses the Offset value fine-tuned with the safety distance ΔSafety.

$$\text{SLOPE\_}lim=K1\times\text{Period}+K2\times\text{Power}-\text{Offset} \quad \text{(Equation III)}$$

This equation is used to calculate the Slope limit value, referred to herein as Slope_lim, which will be the lower limit of the value that the slope, or Slope of the signal SD can assume, guaranteeing that there will be no collision under those operating conditions of the compressor.

Next, the measured value of the slope, referred to herein as Slope_measured, is compared with the limit value Slope_lim calculated. If the Slope_measured is greater than the Slope_lim, then the compressor is still operating in its anti-impact safety margin, or with a amplitude below the necessary amplitude, so that the compressor operates with the load requested. Then, it is possible to increase slightly the power or voltage of the drive signal of the linear motor. As a result of this increase in power of the drive signal, again a check is made to find out if impact occurred between the piston and the cylinder by way of an impact detection step carried out in the same way as that described for the impact detection step performed during the fine-tuning routine.

These steps of increasing power and detecting impact are performed successively, until impact is detected. When an impact is detected, then the fine-tuning routine is performed again, in order to calculate a newly fine-tuned Offset value.

In an alternative embodiment of the invention not illustrated, during the piston operation control routine, when no impact of the piston with the cylinder is detected in the impact detection step, a step can be carried out to check whether the time in which the system is with a measured value of the slope Slope_measured being superior to the limit calculated Slope_lim is greater than a specific period, for example, one hour. If not, the same piston operation control routine is continued.

On the other hand, if this operation time is over 1 hour, then the fine-tuning routine is performed again to calculate a newly fine-tuned Offset value.

Returning to the compressor control, if the measured value of the slope Slope_measured of the displacement signal SD is greater or equal to the limit calculated Slope_lim, then the compressor is operating with a greater operating amplitude than the amplitude considered safe, and runs the risk of colliding with the cylinder head. So the power or voltage of the drive signal of the linear motor can be slightly decreased, so that the compressor resumes operations within the safe operating amplitude. Afterwards, the method according to the invention again moves to the step of verifying whether impact occurred between the piston and the cylinder as a result of this change of power of the drive signal. If impact occurs, then go back to the fine-tuning routine. If there is no impact, return to the step of measuring the power and period of the drive signal, and slope of the displacement signal SD, to calculate the Slope_lim value, and continue performing the successive steps of the compressor control routine.

By performing the compressor control routine in association with the fine-tuning routine, the frequency of collisions of the piston with the cylinder head is significantly reduced. However, at the same time, the piston is controlled to arrive at a position very close to the cylinder head, maximizing its operating amplitude, as well as the performance of the compressor. Since the increase and the reduction in voltage of the drive signal of the linear motor are in highly reduced quantities, this allows a precise fine-tuning of the compressor, with a significantly reduced safety distance between the piston and the cylinder, when operating at its maximum capacity.

FIG. 7 shows the behavior of the displacement signal SD generated by the circuit for detecting the piston position, jointly with the current signal of the compressor $I_c$, and with the comparator signal SC indicating that the piston has attained its maximum position in the displacement stroke. This latter signal SC is generated at the output of the comparator that compares the Slope_measured of the displacement signal SD with the limit calculated Slope_lim.

Note that the signal of the comparator SC forms a square pulse having a length equal to the time interval in which the displacement signal SD is greater than $V_{ref}$, that is, when the piston is near to its maximum position on the displacement stroke. The signal of the comparator SC has the shape of a square wave, with pulses indicative of the moments in which the piston attained its maximum position in the displacement stroke. Observing the behavior of the current signal of the compressor $I_c$, it is also noted that in the moments in which the displacement signal SD assumes its maximum and minimum values, Ic=0.

The graphs shown in FIGS. 11 to 15 show how the slope value of the displacement signal SD, as well as the frequency and the power of the drive signal, vary depending on the operating conditions of the compressor.

FIG. 11 shows the values of the slope of the displacement signal SD at the impact limit (equivalent to the Slope_measured variable in the fine-tuning routine) in various operating conditions of the compressor. The axis of the ordinates shows the temperature of the condenser, and each of the lines illustrated in the graph shows the Slope_measured values for a certain temperature of the evaporator.

The graph of FIG. 12 shows how the power of the drive signal varies at the moment of impact, for different temperature conditions of the condenser and the evaporator. The graph of FIG. 13 correlates the frequency of the drive signal at the moment of impact, with the different temperature conditions of the condenser and the evaporator. Graphs 11 to 13 demonstrate that the parameters of frequency and power of the drive signal, as well as the slope value of the displacement signal, vary significantly depending on the operating conditions of the compressor, and this is why they must be taken into account when calculating the Offset value, which is the parameter created to correlate all these variables to prevent impact of the piston 1 with the cylinder head.

FIG. 14 shows a graph which correlates the maximum displacement of the piston with the corresponding measured Slope value of the displacement signal SD, in different temperature conditions of the evaporator. The axis of the ordinates begins to appear in a negative value, because the value 0 in this graph corresponds to the valve board position. It is possible to note from this graph that for the temperature condition of the evaporator, the slope value of the signal SD decreases, as the piston displacement amplitude increases, that is, the closer the piston approaches the valve board.

The graph of FIG. 15 shows the correlation only between the period of the drive signal and the displacement signal SD, that is, without offsetting the power of the drive signal. This graph illustrates a line corresponding to the theoretical value Slope_lim, and the Slope_measured values at the moment of impact for three different temperature conditions of the evaporator. The results of this graph show that if only the period offset is used, the compressor will operate rather far from the theoretical limit Slope_lim, since the Slope_measured values are quite distant from the straight corresponding to Slope_lim, principally in cases of temperatures −18° and −25° C. of the evaporator. Ideally, the compressor should operate as near as possible to the limit, because otherwise it would necessary to overscale the compressor to operate at the same capacity. When the compressor operates near to its limit, this means that it is working in optimized mode, extracting the maximum capacity from the compressor.

The area above the straight of the theoretical limit Slope_lim corresponds to a safe operating area, that is, when the Slope_measured values are within this region, it is safe that no impact will occur. It may be that in some cases the system operates with a Slope_measured outside the safe operating area, and still there will be no impact, because the occurrence of impact depends on other parameters. So, using only the period offset guarantees a safe operating area, but in some conditions there will be an overscaling of the compressor, and in other conditions, it will be very near to the anti-impact safety limit. In an ideal situation in which the compressor will be used in its most optimized way possible, all the Slope_measured curves would be on top of one another and on the curve of the Slope_lim theoretical limit. This is possible if another offsetting term is added, namely power.

Based on the description of the invention set forth herein, it is obvious that the combination of fine-tuning techniques and piston displacement control techniques, with and without a sensor, provide a more accurate and efficient performance for the compressor than those cited in the state of the art. This association also permits, in certain preferred cases, the use of a less accurate sensor, simpler and cheaper, which does not need to carry out a direct measurement and physical reading of the distance between the piston and the cylinder head, but which makes an indirect measurement by way of electromagnetic induction. This also reduces the possibility of damage to the sensor, because it is not exposed to collisions between the piston and the cylinder head. Even so, if the sensor measurement precision is inferior in relation to those that measure the distance directly, this lesser performance is offset by the association to the fine-tuning and control technique with no sensor and based on other electrical signals of the compressor.

The system and the method of the present invention could also be used to control a piston and cylinder combination in order to avoid the impact of the piston with any part disposed at the end opposite the cylinder head. In this case, the impact-detecting circuit should be configured to detect the end of the stroke and the impact of the piston on the side opposite the cylinder head. The other characteristics of the system could be maintained and merely adapted to this minor change of arrangement of the impact-detecting circuit and the position-detecting circuit. In another alternative embodiment, the system and the method of the present invention could be configured to avoid impact at both ends of the piston displacement stroke simultaneously. This task could be realized by way of two different impact-detecting and position-detecting circuits, each pair of circuits designed to monitor an end of the piston stroke, or also by means of a single impact-detecting circuit and a single position-detecting circuit capable of detecting impact and measuring the position of the piston displacement at both ends simultaneously.

Having described an example of a preferred embodiment, it must be understood that the scope of the present invention encompasses other potential variations, and is only limited by the content of the claims appended hereto, other possible equivalents being included therein

The invention claimed is:

1. System for controlling a linear compressor comprising:

a linear motor that drives the reciprocating motion of a piston (1) inside a cylinder (2);

a position-detecting circuit which generates a displacement signal (SD) indicating the piston displacement amplitude;

an impact-detecting circuit which generates an impact signal (SI) indicating the occurrence of impact of the piston (1) with a cylinder head;

a control circuit that applies a variable drive signal on the linear motor, wherein:

the control circuit receives the displacement signal (SD) and the impact signal (SI), and calculates, based on these signals and on the drive signal, at least an impact prevention limit parameter for the displacement signal (SD), which is proportional to the variation value or the derivative value of the displacement signal (SD) at the moment of impact, defining an anti-impact safety operating area based on this parameter, wherein the impact prevention limit parameter is calculated by the equation $$SLOPEmin = K1 \times Period + K2 \times Power - Offset\_max$$

wherein:

Slope_min is the variation value or the derivative value of the displacement signal (SD) at the moment of impact;

K1 and K2 are respectively period and power offset constants of the drive signal;

Period and Power are the period and power values of the drive signal at the moment of impact; and Offset_max is the impact prevention limit parameter, and wherein the control circuit compares the displacement signal (SD) generated in response to the drive signal with the impact prevention limit parameter, and adjusts the drive signal of the motor based on the result of the comparison.

2. System according to claim 1, wherein the impact prevention limit parameter for the displacement signal (SD) of the piston determines a limit for the maximum displacement amplitude of the piston without impact between the piston and the cylinder head.

3. System according to claim 1, wherein the control circuit comprises:

a data processor which processes the displacement signal (SD), the impact signal (SI) and the drive signal, and calculates the impact prevention limit parameter, and a comparator which compares the impact prevention limit parameter with the displacement signal (SD) and emits a signal indicating whether the displacement signal (SD) is within the anti-impact safety operating area.

4. System according to claim 1, wherein the control circuit receives signals indicating the operating conditions of the compressor and calculates the new drive signal of the motor also based on these operating condition signals of the compressor.

5. System according to claim 1, applied to a cooling system, in which the control circuit receives signals indicating the operating conditions of the cooling system and calculates the new drive signal of the motor also based on these cooling system signals.

6. System according to claim 1, wherein the impact prevention limit parameter Offset is calculated by adding to the Offset_max value a component ΔSafety which is a constant corresponding to the safety distance between the maximum displacement amplitude of the piston and the cylinder head.

7. System according to claim 1, wherein the impact prevention limit parameter is calculated using the arithmetical average of at least three values of the impact prevention limit parameter calculated at three different times.

8. System according to claim 1, wherein the position-detecting circuit and the impact-detecting circuit of the piston are integrated in a same sensor circuit.

9. System according to claim 1, wherein the control circuit comprises a memory storing at least some parameters of the displacement signals (SD) and impact signals (SI) and of the drive signal, and the values of the parameters calculated by the control circuit.

10. System according to claim 1, wherein the control circuit increases the drive signal of the motor if the result of the comparison shows that the displacement signal (SD) is within the anti-impact safety operating area, and reduces the drive signal of the motor if the result of the comparison shows that the displacement signal (SD) is outside the anti-impact safety operating area.

11. Method of controlling a linear compressor having a piston (1) driven by a linear motor and displaced inside a cylinder (2), a position-detecting circuit that emits a signal (SD) indicating displacement of the piston inside the cylinder, and an impact-detecting circuit that emits a signal (SI) indicating impact of the piston with a cylinder head, the method comprising the steps of:

(a) carrying out a fine-tuning routine on the linear compressor that comprises:

detecting an impact of the piston (1) with the cylinder head;

measuring the drive signal at the moment of impact between the piston and the cylinder head;

measuring the displacement signal (SD) at the moment of impact between the piston and the cylinder head;

calculating an impact prevention limit parameter based on the measurements of the drive signal and the displacement signal (SD) upon impact of the piston with the cylinder head, wherein the impact prevention limit parameter is proportional to the variation value or the derivative value of the displacement signal (SD) at the moment of impact, and the impact prevention limit parameter is calculated by the equation $$SLOPEmin = K1 \times Period + K2 \times Power - Offset\_max$$

wherein:

Slope_min is the variation value or the derivative value from the displacement signal (SD) at the moment of impact;

K1 and K2 are respectively period and power offset constants of the drive signal;

Period and Power are the period and power values of the drive signal at the moment of impact; and Offset_max is the impact prevention limit parameter;

(b) carrying out a control routine on the linear compressor that comprises the steps of:

measuring the drive signal and the displacement signal (SD);

calculating a limit value that a control parameter of the displacement signal (SD) can assume without impact between the piston and the cylinder head, in function of the drive signal measured and of the impact prevention limit parameter calculated in the fine-tuning routine, and determining an anti-impact safety operating area for the control parameter of the displacement signal (SD);

comparing the value measured of the parameter of the displacement signal (SD) with the limit value calculated of the control parameter of the displacement signal (SD);

if the value measured of the control parameter of the displacement signal (SD) is within the anti-impact safety operating area, varying the drive signal to increase the efficiency of the linear compressor;

if the value measured of the control parameter of the displacement signal (SD) is outside the anti-impact safety operating area, varying the drive signal to reduce the efficiency of the linear compressor, detecting the occurrence of impact of the piston with the cylinder head by analyzing the impact signal (SI), and if no impact occurred, execute the fine-tuning routine to recalculate the anti-impact fine-tuning variable, and if no impact occurred, execute the control routine.

12. Method according to claim 11, wherein the Offset impact prevention limit parameter is calculated by adding to the Offset_max value a component ΔSafety which is a constant corresponding to the safety distance between the maximum displacement amplitude of the piston and the cylinder head.

13. Method according to claim 11, wherein:

the step of calculating a limit value that a control parameter of the displacement signal (SD) can assume without impact between the piston and the cylinder head comprises calculating the derivative SLOPE_lim of the displacement signal (SD) by the equation $$SLOPE\_lim=K1\times Period+K2\times Power-Offset \quad \text{(Equation III)}$$

the step of comparing the value measured of the control parameter of the displacement signal (SD) with the calculated limit value of the control parameter of the displacement signal (SD) comprises comparing the value measured of Slope_measured of the derivative of the displacement signal (SD) with the calculated SLOPE_lim value;

the step of varying the drive signal to increase the efficiency of the linear compressor comprises increasing the voltage of the drive signal; and the step of varying the drive signal to reduce the efficiency of the linear compressor comprises decreasing the voltage of the drive signal.

14. Method according to claim 11, further comprising a step of acquiring signals indicating the operating conditions of the compressor, which are considered in the step of varying the drive signal.

15. Method according claim 11, further comprising a step of storing at least some of the values of the signals generated by the control circuit, the values of the signals fed to the control circuit and the values of the parameters calculated by the control circuit.

16. Method according to claim 11, wherein the variation of the displacement signal (SD) is measured at a time interval in which the amplitude of the displacement signal (SD) varies between a pre-determined reference value and zero.

17. Method according to claim 11, wherein the impact prevention limit parameter is calculated using the arithmetical average of at least three values of the impact prevention limit parameter calculated at three different times.

18. System for controlling a linear compressor, said system comprising means for controlling the operation of the linear compressor based on a displacement signal (SD) of a piston (1) inside a cylinder (2) of the compressor, and on an impact signal (SI) of the piston (1) with a cylinder head (2), wherein the means for controlling the operation of the linear compressor calculates, based on the displacement (SD) and impact (SI) signals, at least an impact prevention limit parameter for the displacement signal (SD), which is proportional to the variation value or the derivative value of the displacement signal (SD) at the moment of impact, defining an anti-impact safety operating area of the linear compressor based on this parameter, wherein the impact prevention limit parameter is calculated by the equation $$SLOPEmin=K1\times Period+K2\times Power-Offset\_max$$

wherein:

Slope_min is the variation value or the derivative value of the displacement signal (SD) at the moment of impact;

K1 and K2 are respectively period and power offset constants of the drive signal;

Period and Power are the period and power values of the drive signal at the moment of impact; and Offset_max is the impact prevention limit parameter.

19. System for controlling a linear compressor according to claim 18, wherein the means for controlling the operation of the linear compressor compares the displacement signal (SD) generated in response to a drive signal with the impact prevention limit parameter, and adjusts the drive signal of the motor based on the result of the comparison.

20. Method of controlling a linear compressor, comprising controlling the operation of the linear compressor based on a displacement signal (SD) of a piston (1) inside a cylinder (2) of the compressor, and on an impact signal (SI) of the piston (1) with a cylinder head inside a cylinder (2), and during the operation control of the linear compressor, the method comprises a step of calculating, based on the displacement (SD) and impact (SI) signals, at least an impact prevention limit parameter for the displacement signal (SD), which is proportional to the variation value or the derivative value of the displacement signal (SD) at the moment of impact, and defining an anti-impact safety operating area based on this parameter, wherein the impact prevention limit parameter is calculated by the equation $$SLOPEmin=K1\times Period+K2\times Power-Offset\_max$$

wherein:

Slope_min is the variation value or the derivative value from the displacement signal (SD) at the moment of impact;

K1 and K2 are respectively period and power offset constants of the drive signal;

Period and Power are the period and power values of the drive signal at the moment of impact; and Offset_max is the impact prevention limit parameter.

21. Method of controlling a linear compressor according to claim 20, further comprising a step of comparing the displacement signal (SD) generated in response to the drive signal with the impact prevention limit parameter, and adjusting the drive signal of the motor based on the result of the comparison.

* * * * *